United States Patent [19]

Menzel

[11] Patent Number: 5,201,861
[45] Date of Patent: Apr. 13, 1993

[54] APPARATUS FOR THE PREPARATION OF ICE CREAM, MILKSHAKES, SORBETS, FROZEN DESSERTS, AND THE LIKE, IN EACH CASE FROM A PUMPABLE STARTING MIXTURE

[75] Inventor: Waldemar Menzel, Kulmbach-Burghaig, Fed. Rep. of Germany

[73] Assignee: Lumen GmbH Nahrmittel- und Maschinenfabrik, Kulmbach, Fed. Rep. of Germany

[21] Appl. No.: 681,519
[22] PCT Filed: Oct. 11, 1989
[86] PCT No.: PCT/EP89/01197
§ 371 Date: May 2, 1991
§ 102(e) Date: May 2, 1991
[87] PCT Pub. No.: WO90/04927
PCT Pub. Date: May 17, 1990

[30] Foreign Application Priority Data

Nov. 5, 1988 [DE] Fed. Rep. of Germany ....... 3837604

[51] Int. Cl.$^5$ ............................................. A23G 9/12
[52] U.S. Cl. ........................................ 62/135; 62/342
[58] Field of Search ................. 62/342, 135; 137/13, 137/251.1, 828

[56] References Cited

U.S. PATENT DOCUMENTS

| | | | |
|---|---|---|---|
| 4,203,472 | 5/1980 | Dulaney | 137/828 |
| 4,269,212 | 5/1981 | Kaartinen | 137/13 |
| 4,309,875 | 1/1982 | Radichio | 62/66 |
| 4,460,398 | 7/1984 | Sasaki | 137/13 X |
| 4,612,959 | 9/1986 | Costello | 137/251.1 X |
| 4,680,944 | 7/1987 | Menzel | 62/342 |

Primary Examiner—William E. Tapolcai

[57] ABSTRACT

An apparatus for the preparation of ice cream, milkshakes, sorbets, frozen desserts and the like, in each case from a pumpable starting mixture, comprises a storage container (1) for the starting mixture and a cooling or freezing cylinder (2) arranged below said container with which it communicates via a supply conduit (25), in which cylinder (2) a stirring and scraping mechanism (9) is arranged, the supply conduit (25) opening into an inlet chamber (7) located at one end of the cylinder (2), a discharge valve (19) being provided at the other end of the cylinder (2), only the cylinder (2) being provided with a heating (6) for pasteurizing the starting mixture, a thermostat (53) being provided to limit the wall temperature of the cylinder (2), and devices being provided for transporting the starting mixture from the inlet chamber (7) to the discharge valve (19). To obtain a bacteriologically safe pasteurization product on the one hand and to eliminate any alterations to the flavor on the other hand, a closable connecting conduit (22), which opens out of the end region (21) of the cylinder (2) adjacent the discharge valve (19), is provided between the storage container (1) and the cylinder (2). A freezing device (62) connected with the cooling aggregate (58) of the apparatus is arranged on the connecting conduit (22) to block it.

1 Claim, 2 Drawing Sheets

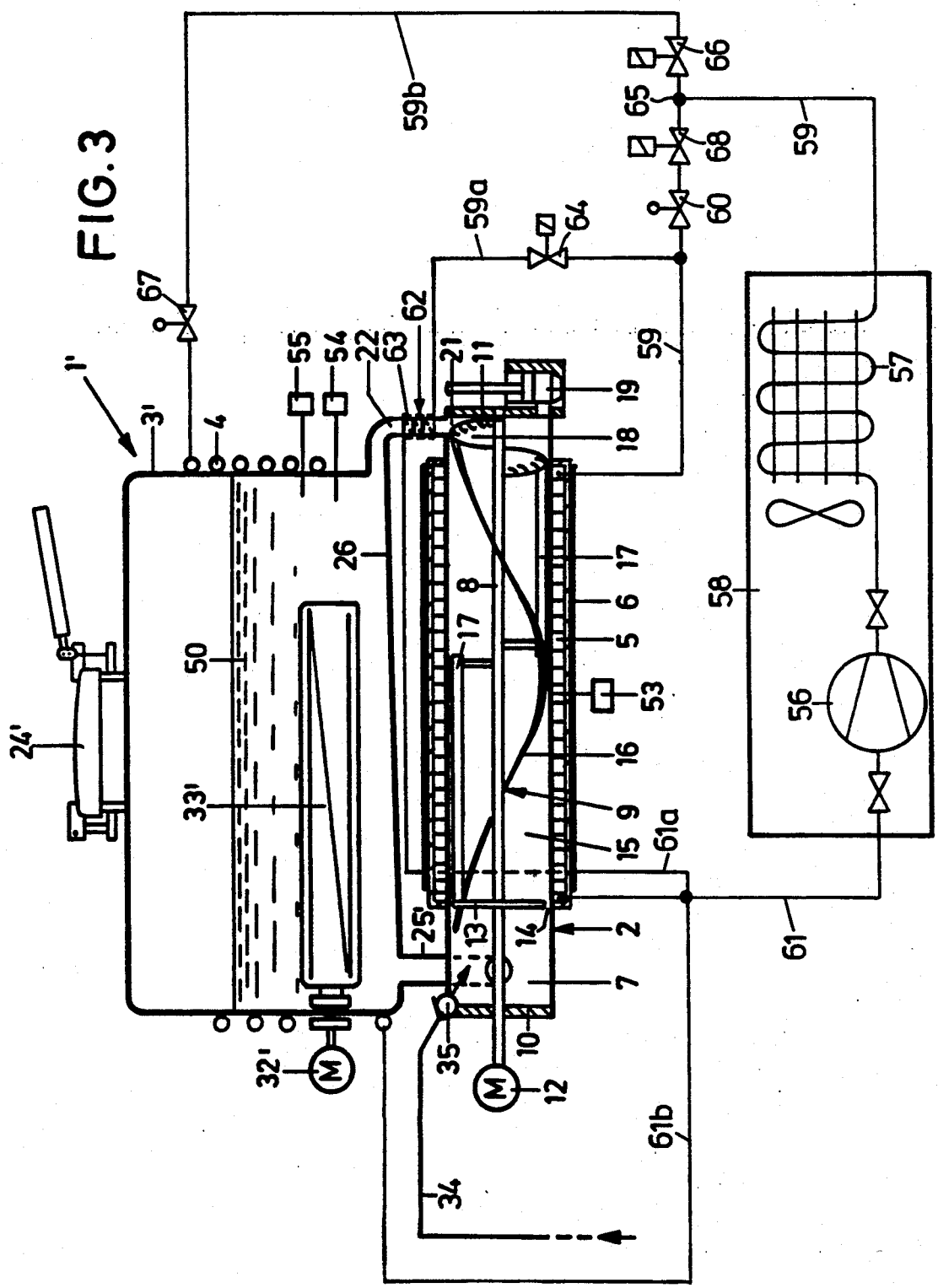

APPARATUS FOR THE PREPARATION OF ICE CREAM, MILKSHAKES, SORBETS, FROZEN DESSERTS, AND THE LIKE, IN EACH CASE FROM A PUMPABLE STARTING MIXTURE

The invention relates to an apparatus according to the preamble of claim 1.

In an apparatus of the generic type known from German published patent application 35 44 802 (corresponding to U.S. Pat. No. 4,680,944) a connecting conduit is provided between the storage container and the end region of the cooling or freezing cylinder adjacent the discharge valve, a valve being arranged in the connecting conduit to close off the connecting conduit. It is thus achieved that the ice cream mix can be pumped through the cooling or freezing cylinder, from there to the storage container, and back to the cylinder during pasteurization or also during normal storing operation, when the ice cream mix is kept at a storing temperature slightly above the freezing point. Thus a satisfactory result is achieved from a bacteriological standpoint with comparatively simple means, while, on the other hand, changes in flavor of the ice cream mix are avoided during pasteurization, since a circulation of the total contents of the cooling and freezing cylinder and of the storage container is made possible during pasteurization. The valve to be installed in the connecting conduit is however very expensive and some remaining bacteriological contamination cannot be definitely precluded.

It is accordingly the object of the invention to further develop the apparatus of the generic type such that a bacteriologically safe solution to close off the connecting conduit is created by simple means.

This object is attained in accordance with the invention by the features in the characterizing part of claim 1. The nub of the invention resides in that during normal operation, while servings of ice cream must be drawn off, i.e. while the connecting conduit must be closed, the ice cream mix contained in the latter is frozen. A possibility of closing is thus created with the specific means of the apparatus, namely the cooling aggregate anyway available. If the plug of ice cream mix in the connecting conduit is to be melted, then the supply of coolant to the freezing device is switched off.

Further features, advantages and details of the invention will become apparent from the sub-claims and the ensuing description of exemplary embodiments taken in conjunction with the drawing, in which FIG. 1 is a schematic illustration of an apparatus according to the invention, seen in a vertical longitudinal section;

FIG. 3 is a schematic illustration of a modified embodiment of the apparatus according to the invention, in a vertical longitudinal section.

Figure 2:
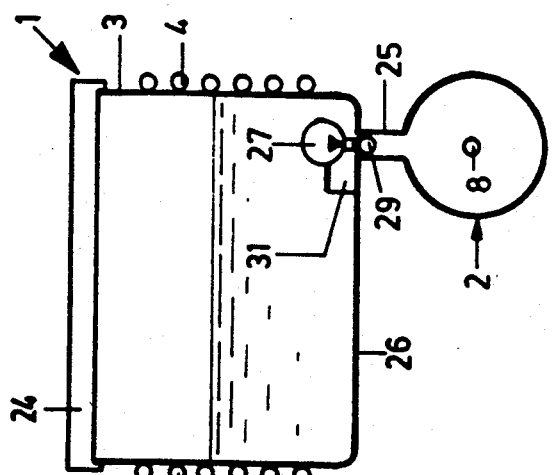
FIG. 2 is a cross section taken along the line II—II of FIG. 1.
Figure 1:
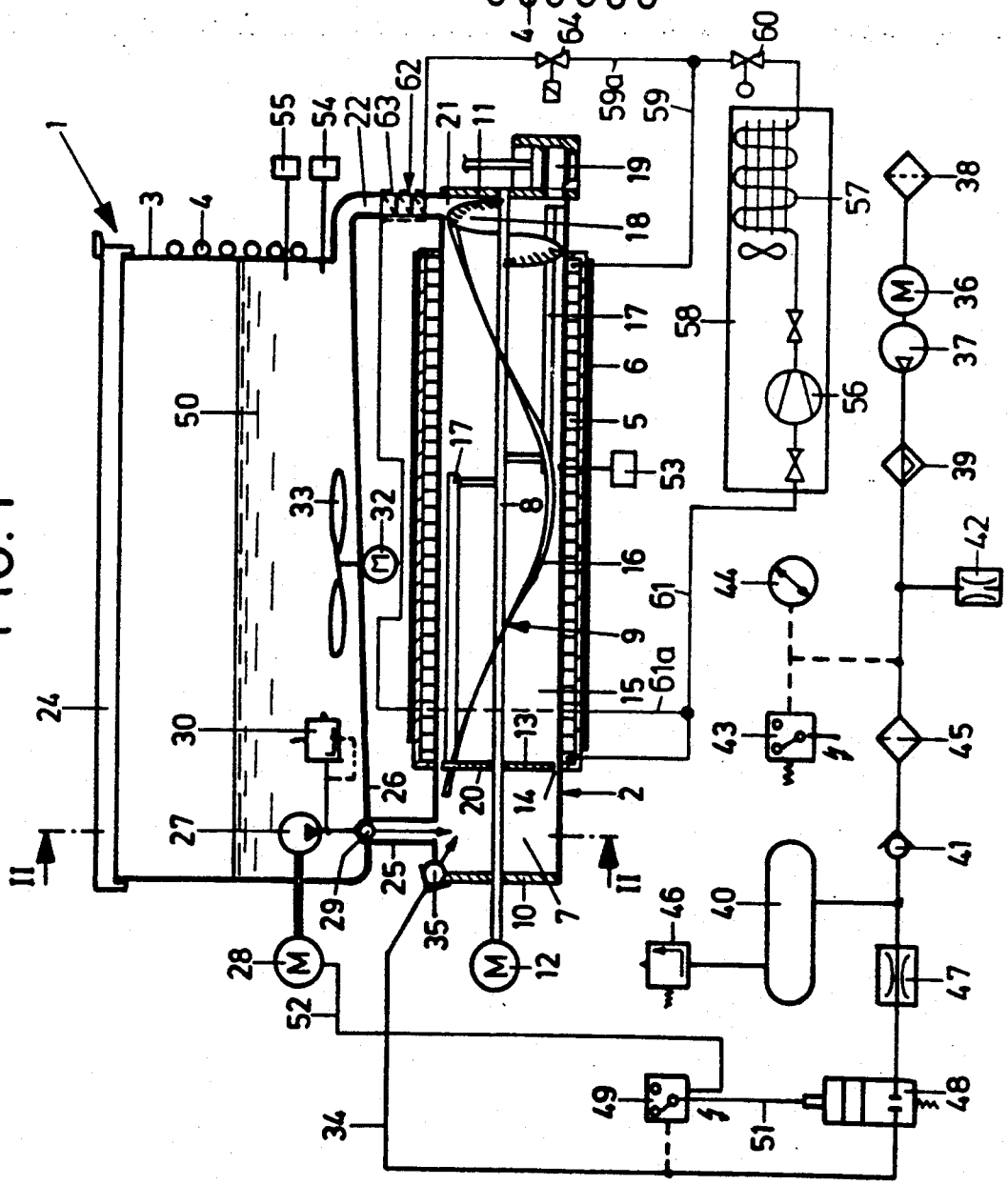

As shown in FIGS. 1 and 2, a storage container 1 is disposed above a horizontal cooling or freezing cylinder 2—in a conventional fashion—and with it forms a unit. The side walls 3 of the storage container 1 are provided with a cooling tube 4, which extends approximately helically about the side walls 3 and is only schematically illustrated.

The cylinder 2 is surrounded by a cooling jacket 5 through which a coolant can be pumped. The cooling jacket 5 itself is surrounded in turn by a heating jacket 6. The cooling jacket 5 and heating jacket 6 extend substantially over the entire length of the cylinder 2, with the exception of an area located on one end—seen on the left in FIG. 1—in which an inlet chamber 7 of the cylinder 2 is located.

The cylinder 2 is coaxially penetrated by a shaft 8 of a stirring and scraping mechanism 9, which shaft 8 is rotatably supported in end walls 10, 11 of the cylinder 2 and extends out of one end—on the left in FIG. 1. The stirring and scraping mechanism 9 is driven on this end by an electric motor 12.

A disk 13 is attached to the shaft 8, leaving only a very narrow gap 14 with respect to the wall of the cylinder 2. This disk 13 divides the inlet chamber 7 from the actual cooling and/or freezing chamber 15 in the cylinder 2, this chamber 15 being surrounded by the cooling jacket 5 and heating jacket 6. A helical stirring element 16 is secured on the shaft 8 in the chamber 15. Also attached to the shaft 8 are two scraper blades 17 contacting the inner wall of the cylinder 2, which continuously scrape the ice cream mix from the inner wall of the cylinder 2. Contiguous with the helical stirrer 16, a close-pitch worm 18 is also attached to the shaft 8, its worm pitch being such as to exert a certain backpressure effect with respect to the helical stirrer 16. A discharge valve 19 is attached in front of the end wall 11 opposite the motor 12. In the disk 13 acting as a partition, there may be a through opening 20 connecting the inlet chamber 7 with the chamber 15.

The cooling and/or freezing chamber 15 communicates with the storage container 1 in the end region 21 adjacent to the discharge valve 19 or to the associated end wall 11 via a connecting conduit 22.

The storage container 3, which is closable by means of a cap 24, communicates with the inlet chamber 7 of the cylinder 2 via a supply conduit 25, which is preceded by a pump 27 disposed in the storage container 1 on its bottom 26. This pump 27 is driven by an electric motor 28. The pump 27 may be a gear pump. It is preceded, in the vicinity of the supply conduit 25, by a check valve 29, which prevents a return flow of liquid from the cylinder 2, or its inlet chamber 7, to the storage container 1.

The pump 27 is also provided with an overpressure valve 30, which opens if the counterpressure coming from the inlet chamber 7 exceeds a predetermined value. In that case, the liquid to be pumped into the inlet chamber 7 from the storage container 1 is returned to the storage container 1 by a short circuit. It is conventional in the trade to equip pumps in this way.

The pump 27 has an intake fitting 31, the open end of which is in the vicinity of the bottom 26 of the storage container 1, so that there are no idle spaces in the storage container 1.

A stirrer 33 driven by an electric motor 32 is disposed on the bottom 26 of the storage container 1, continuously recirculating the liquid located in the storage container 1.

Air is introduced into the upper portion of the inlet chamber 7 via an air line 34. To prevent liquid and/or air from returning to the air line 34 from the inlet chamber 7, the air line is provided with a check valve 35, which may be embodied by what is known as a lip valve, for example. Compressed air is supplied to the air line 34 by a compressor 37 driven by an electric motor 36, the compressor 37 being preceded by an air filter 38. A compressed air dehumidifier 39 follows the compressor.

A compressed air storage container 40 is also provided in the air line 34, and a check valve 41 is disposed between this container 40 and the compressor 37. Between the compressor 37 and the check valve 41, an outlet throttle valve 42 is also provided, through which some compressed air flows out continuously. Because of the check valve 41, however, no compressed air can flow out of the compressed air storage container 40 back to the throttle valve 42. A pressure monitor 43 is also disposed in the air line 34 between the compressor 37 and the check valve 41, and it switches the compressor 37 on whenever the pressure in the air line 34 between the compressor 37 and the check valve 41 falls below a certain minimum. This minimum pressure may be on the order of 1.7 bar, for example. The compressor switches back off again whenever the pressure exceeds a predeterminable maximum pressure, such as 2.0 bar. The air pressure can be monitored visually by means of a manometer 44. The check valve 41 is also preceded by a sterile compressed air filter 45. A pressure limiting valve 46 is disposed on the compressed air storage container 40.

A throttle valve 47 and a magnetic valve 48 are disposed in the air line 34 between the compressed air storage container 40 and the check valve 35. A pressure monitor 49 is also provided between the magnetic valve 48 and the check valve 35.

A cooling aggregate 58 in conventional manner consisting of a compressor 56 and a liquefier 57 is provided to generate the necessary low temperatures. A line 59 leads from the outlet of the liquefier to the cooling jacket 5 of the cylinder 2 in the vicinity of its discharge valve 19. An expansion valve 60 is provided in the line 59 to expand the coolant liquefied in the liquefier 57. A suction line 61 leads back to the inlet of the compressor 56 from the other end of the cooling jacket 5.

A freezing device 62 is arranged to surround the connecting conduit 22. This device consists of a tube 63, which helically surrounds the connecting conduit 22, and which is connected via a line 59a behind the expansion valve to the line 59 on the one hand and via a suction line 61a to the suction line 61 on the other hand. The tube 63 or the freezing device 62, respectively, is thus connected parallel to the cooling jacket 5 in the cooling circuit of the cooling aggregate 58. A magnetic valve 64 is located in the line 59a assuring that the supply of coolant to the freezing device 62 can be switched off even when coolant is supplied to the cooling jacket 5. The freezing device 62 is made such that upon actuation by a coolant the contents of the connecting conduit 22 are frozen.

The exemplary embodiment described above functions as follows:

The storage container is assumed to contain a so-called ice cream mix 50, that is, a liquid starting mixture for making ice cream, and that ice cream is prepared from this mixture in the cylinder 2, while air is simultaneously incorporated into it.

The ice cream mix 50 is pumped into the inlet chamber 7 of the cylinder 2 by means of the pump 27, in accordance with the pressure prevailing in the cylinder. Except for the starting up phase, when it is not constant, the pressure in the cylinder 2 varies only when servings of ice cream are drawn off by means of the discharge valve 19, and so the pump 27 is always switched on during or after the drawing of a serving of ice cream.

The air needed for aerating the ice cream is supplied via the air line 34. The quantity of air to be supplied per unit of time through the air line 34 is set a the throttle valve 47. Typically this may be done such that air is forced into the inlet chamber at a rate between 0.8 and 2.7 liters per minute. Since the output of the pump 27 per unit of time is constant and amounts for example to 2.5 liters per minute, the volumetric ratio of ice cream mix to air that is supplied per minute can be kept very accurately at a predetermined value.

If the pressure in the cylinder 2 drops because a serving of ice cream has been withdrawn, then the pressure in the line 34 between the check valve 35 and the magnetic valve 48 also drops, and so the pressure monitor registers this pressure drop. If the pressure drops below a predetermined value, for instance 1.2 bar, then a signal is sent via a control line 51 for opening the magnetic valve 48, and a signal is sent for switching on the motor 28 and the pump 27 via a control line 52. Air and ice cream mix are then pumped into the inlet chamber 7 of the cylinder 2 at a predetermined quantity ratio. Once the pressure in the cylinder 2 has again attained a predetermined maximum value, for instance 1.5 bar, then by way of appropriate signals from the pressure monitor 49 the magnetic valve 48 is closed and the motor 28 of the pump 27 is switched off. This process is repeated continuously, whenever servings of ice cream are drawn off at the discharge valve 19.

The storage container 1 is unpressurized; the ice cream mix stored in it is kept chilled at a storage temperature of approximately 2° C. and is periodically recirculated by the stirrer 33, to assure a uniform temperature within the ice cream mix.

Throughout this process the cooling jacket 5, on the one hand, and the freezing device 62, on the other hand, are supplied with coolant from the cooling aggregate 58, i.e. the magnetic valve 64 is open. The ice cream mix contained in the connecting conduit 22 is frozen, so that there is no connection between the cooling and/or freezing chamber 15 and the storage container 1 in this area.

As will be understood from the foregoing, the cylinder 2 is always filled with ice cream mix or with prepared ice cream, regardless of whether only a little ice cream mix 50, or a large amount, is present in the storage container 1. Whenever the ice cream mix 50 still contained in the storage container 1 and the prepared ice cream in the cylinder 2 are to be pasteurized—typically after the close of business for the day—the supply of compressed air is shut off by the general closure of the magnetic valve 48. At the same time, the stirring and scraping mechanism 9 and the pump 27 are put into operation. The cooling process via the cooling tube 4 and the cooling jacket 5 and the freezing device 62 is also switched off, and the heating by the heating jacket 6 is switched on. Due to the heat transfer the ice stored in the cylinder 2 is melted and the ice cream mix 50 is further heated. The heat also flows into the connecting conduit 22 tightly connected with the cylinder 2 and melts off the ice cream mix frozen onto its inner wall. As a result of the pressure acting upon the melted-off ice cream plug in the connecting conduit 22 from the chamber 15, this melted-off plug is pressed into the storage container 1. During the pasteurizaton process, the heating jacket 6 is regulated via thermostat 53 that measures the temperature of the inner wall of the cylinder 2. The ice cream mix is moved toward the discharge valve by the helical stirrer 16 and from there is pumped back into the storage container 1 through the opened connecting conduit 22 by means of the worm 18, which during operation is used to force the servings of ice cream out through the discharge valve 19. From the storage container, the ice cream mix is pumped back into the inlet chamber 7 by means of the pump 27. Thus a continuous circulation of the ice cream mix between the storage container 1 and cylinder 2 is attained, and all the regions of the wall of the cylinder 2 are scraped. Since the ice cream mix becomes highly turbulent in the cylinder because of the stirring and scraping mechanism 9 and in particular the scraper blades 17, there is good heat transmission to the ice cream mix from the surface of the cylinder 2 that is heated by the heating jacket 6. When the ice cream mix is to be heated to approximately 72° C. for pasteurization, it is accordingly sufficient for the temperature of the inner wall of the cylinder 2 to be kept at a temperature of from 75° to 80° C. by means of the thermostat 53. This assures that the ice cream mix will not burn onto the inner wall of the cylinder 2 and take on a caramel-like flavor. As soon as all the ice cream mix 50 has attained the temperature of pasteurization, which is detected via a thermostat 54 housed in the storage container 1, the heating jacket 6 is switched off; this may be done in a delayed manner—under the control of a clock, not shown—to assure effective germicidal action in the ice cream mix 50.

The refrigeration system, not shown in the drawing, is then switched on again, and the ice cream mix 50 is chilled to the storage temperature of 2° C., via the cooling tube 4 and the cooling jacket 5. The attainment of this storage temperature is monitored via a thermostat 55 housed in the storage container 1. While the ice cream mix 50 is chilled to the storage temperature and during storing, the magnetic valve 64 is closed, so that no coolant is admitted to the freezing device. While the total ice cream mix is chilled after pasteurization and during normal storing operation, the connecting conduit 22 is not closed by an ice cream plug. Only when the normal discharge operation is switched on, the magnetic valve 64 is opened with the consequence that the connecting conduit 22 is closed by an ice cream plug.

For pasteurization, it is possible to double the speed of the pump 27, in order to increase the recirculation of the mixture. The quantity recirculated per unit of time between the cylinder 2 and storage container 1 is determined solely by the capacity of the pump 27.

In the embodiment of FIG. 3, elements identical to those in the embodiment of FIGS. 1 and 2 are identified by the same reference numerals. Elements that in principle are functionally the same but that differ structurally are identified by the same reference numerals, provided with a prime. Description of such elements in detail once again should therefore be unnecessary.

The apparatus of FIG. 3 has a pressure-tight storage container 1', closed off by a cap 24' that closed in a pressure-tight, air-tight manner.

A roller-like stirrer 33' that is drivable by an electric motor 32' is disposed in the storage container 1'.

A supply conduit 25' discharges from the storage container 1' into the inlet chamber 7 of the cylinder 2 and is embodied by a pipe bend of relatively large cross section, which discharges into the inlet chamber approximately at the level of the shaft 8 of the stirring and scraping mechanism 9. Through this supply conduit 25', compressed air delivered via the air line 34 can rise in the storage container 1' as well, which is why the storage container must be embodied such that it is air-thight and pressure-tight. The supply of compressed air may be effected in the conventional manner, for instance as shown and described in German patent 12 77 877 (corresponding to U.S. Pat. No. 3,402,567); this is not critical in the present context.

The recirculation of the ice cream mixture during pasteurization is effected solely by means of the stirring and scraping mechanism 9, including the worm 18.

For pasteurization, the magnetic valve 64 is closed so that no coolant is admitted to the freezing device 62. The recirculation of the ice cream mix can take place in the claimed manner. The return flow takes place freely through the supply conduit 25'. The temperature control and the termination of the pasteurization process are effected as in the foregoing embodiment.

FIG. 3 also shows the connection of the cooling tube 4 on the storage container 1' to the cooling aggregate 58. The corresponding connection can be identical in the embodiment according to FIGS. 1 and 2. It is not shown there only for reasons of space. Another line 59b branches from the line 59 to supply the individual cooling devices with coolant liquefied in the liquefier 57 and leads to the cooling tube 4 of the storage container 1'. A suction line 61b leads from this cooling tube 4 back to the suction line 61. In order to assure the possibility of individually actuating the cooling of the storage container 1', a magnetic valve 66 is arranged in the line 59b behind its branching 65 from the line 59 and serves to close off the supply of liquefied coolant to the line 59b. An individual expansion valve 67 for the cooling of the storage container 1' is still provided behind the magnetic valve 66. Behind the branching 65 and ahead of the expansion valve 60 still another magnetic valve 68 is provided in the line 59, by means of which also the supply of coolant to the cooling jacket 5 and to the freezing device 62 can be blocked.

Instead of ice cream mix, other starting mixtures can also be used, for instance for milkshakes, sorbets or frozen desserts, as long as these starting mixtures are capable of being pumped, or in other words are in liquid form.

I claim:

1. An apparatus for the preparation of ice cream, milkshakes, sorbets, frozen desserts, and the like, each from a pumpable starting mixture, comprising
   a storage container (1, 1') for the starting mixture;
   a cooling or freezing cylinder (2) with a first end portion and a second end portion, an inlet chamber (7) being formed at the first end portion in the cylinder (2), and a discharge valve (19) being provided at the second end portion;
   a supply conduit (25, 25'), which connects the storage container (1, 1') with the inlet chamber (7);
   a connecting conduit (22), which connects the second end portion of the cylinder (2) with the storage container (1, 1');
   a rotatably drivable stirring and scraping mechanism (9) arranged in the cylinder (2);
   a cooling jacket (5) surrounding the cylinder (2);
   a cooling aggregate (58), which is connected with the cooling jacket (5) via coolant lines (59, 61) for the cooling of the cylinder (2) during the preparation and storage of ice cream, milkshakes, sorbets, frozen desserts and the like in the cylinder (2);
   a heater (6) for the pasteurizing of the starting mixture, which surrounds only the cylinder (2);
   a thermostat (53) controlling the heater (6) for limiting the wall temperature of the cylinder (2) during the pasteurizing of the starting mixture;

transportation means for transporting the starting mixture from the inlet chamber (7) to the discharge valve (19);

a pump (27) for transporting the starting mixture from the storage container (1, 1') into the inlet chamber (7) and from the second end portion—at least during the pasteurizing process—through the connecting conduit (22) back into the storage container (1, 1');

wherein the connecting conduit (22) is provided with a freezing device (62), which surrounds it and is fixedly mounted to it, and which is connected with the cooling aggregate (58) via coolant lines (59, 59a, 61, 61a), and wherein, in at least one coolant line (59a), a valve (64) is provided for interrupting any cooling of the freezing device during the pasteurizing of the starting mixture.

* * * * *